United States Patent [19]

Toshimitsu et al.

[11] Patent Number: 4,523,244
[45] Date of Patent: Jun. 11, 1985

[54] MAGNETIC HEAD

[75] Inventors: Naohiko Toshimitsu; Masayuki Fujimura, both of Chichibu, Japan

[73] Assignee: Canon Denshi Kabushiki Kaisha, Saitama, Japan

[21] Appl. No.: 386,875

[22] Filed: Jun. 10, 1982

[30] Foreign Application Priority Data

Jul. 15, 1981 [JP] Japan .............................. 56-109401

[51] Int. Cl.³ .............................................. G11B 5/10
[52] U.S. Cl. ..................................................... 360/129
[58] Field of Search ............................................ 360/129

[56] References Cited

U.S. PATENT DOCUMENTS 2,927,974  3/1960  Stovall .................................. 360/129
3,610,839  10/1971  Sand .................................... 360/129
4,306,262  12/1981  Takano ................................. 360/129
4,322,764  3/1982  Tanaka ................................. 360/129

FOREIGN PATENT DOCUMENTS 22202  2/1980  Japan ................................... 360/129

Primary Examiner—Robert S. Tupper
Attorney, Agent, or Firm—Fitzpatrick, Cella, Harper & Scinto

[57] ABSTRACT

A magnetic head with the least cross-talk due to leakage magnetic flux in the shield case accommodating therein the magnetic head, the reduction in the cross-talk being realized by chamfering at least one side of an opening formed in the shield case, which are substantially perpendicular to the travelling direction of a magnetic recording medium, in a slant or arcuate surface form.

2 Claims, 10 Drawing Figures

MAGNETIC HEAD

BACKGROUND OF THE INVENTION

1. Field of the Invention

This invention relates to a magnetic head of a construction, in which a plurality of head elements are exposed to outside through an opening formed in a shield case.

2. Description of the Prior Art

The magnetic head of the above-described construction has heretofore been realized as shown in FIGS. 1A and 1B of the accompanying drawing, wherein a magnetic core half 2, around which a winding 3 is wound and which has a magnetic gap 4 formed in its top part, is housed in a shield case 1 made of a magnetic material, and the top of the magnetic core 2 is positioned at a window opening 1a formed in the shield case 1 so as to enable it to contact a magnetic recording medium 6 slide-moving thereon in the direction of an arrow A for magnetic recording and reproduction of informations to and from the recording medium 6. In this known construction, a plurality of magnetic cores 2, 2' are provided for effecting the recording and reproduction on a plurality of tracks of the magnetic recording medium, thus constituting a multi-element structure.

In such multi-element magnetic head accommodated in the shield case of magnetic material, however, there inevitably occurs a phenomenon such that signals reproduced by one head element transfer to other head element due to leakage of magnetic flux when those signals recorded in the magnetic recording medium 6 are to be reproduced. Such phenomenon will hereinafter be referred to as "cross-talk". This cross-talk is expressed in terms of a ratio of a reproduction output of the head element at a non-recorded zone of the running magnetic recording medium to a reproduction output of the head element at a recorded zone of the recording medium. It has been possible that, up to 40 to 50 dB or so of this ratio, the cross-talk can be avoided by interposing between the head elements 2, 2' a shut-off plate 5 of a magnetic material functioning to prevent the leakage magnetic flux from moving from one head element to the other. However, when the ratio is above 50 dB, in particular 60 dB and above, the shut-off plate will no longer serve any purpose, i.e., when both edge portions a, a' or either of them in the window 1a of the above-mentioned shield case 1, which are substantially perpendicular to the travelling direction of the recording medium 6, touches the recording medium at the time of reproduction, a very small magnetic flux which the magnetic recording medium picks up at a location between the edge portions a, a' and the magnetic gaps 4, 4' greatly affect the result of reproduction.

SUMMARY OF THE INVENTION

It is therefore a primary object of the present invention to provide a magnetic head which has reduced a cross-talk due to influence of a shield case accommodating therein the magnetic head, and which has improved a magnetic recording and reproduction.

DETAILED DESCRIPTION OF THE PREFERRED EMBODIMENTS

In the following, the present invention will be described in more detail with reference to preferred embodiments thereof shown in the accompanying drawing.

Figure 1A:
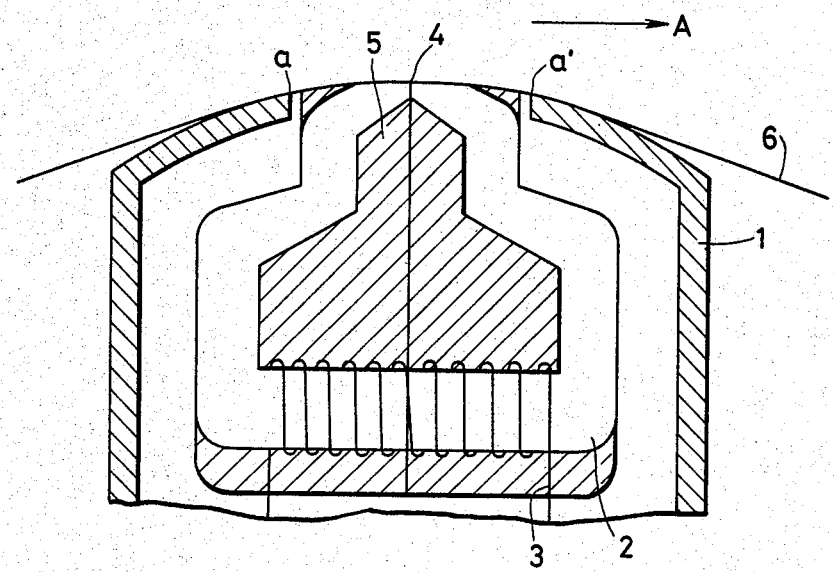
FIGS. 1A and 1B are respectively a cross-sectional view and a front view showing a structure of a conventional magnetic head.
Figure 1B:
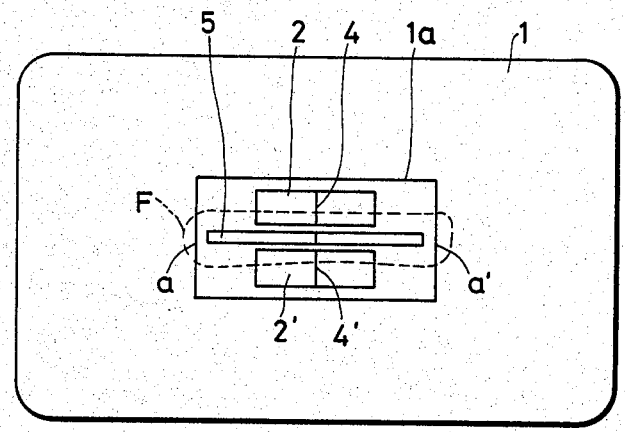
Figure 2:
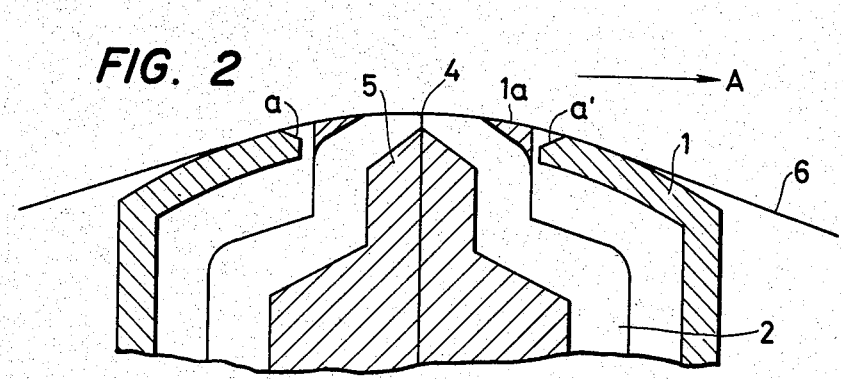
FIG. 2 is a partial cross-sectional view showing the main part of the magnetic head according to the present invention.

According to the present invention, edge or side portions a, a' which form the sides of a window opening 1a of a shield case, and which are substantially perpendicular to the travelling direction A of a recording medium 6, are chamfered to form the portions in a mild slope or arcuate shape, as shown in FIG. 2. When the edge portions a, a' in their unchamfered state contact the magnetic recording medium 6, there is formed a magnetic circuit between the edge portions a, a' of the shield case 1 and a magnetic gap 4 with respect to the shield case 1 and a magnetic core 2 when those signals recorded in the recording medium 6 are to be reproduced. As the result of this magnetic circuit formation, a magnetic flux F flowing therein passes through the shield case 1 and leaks out to the magnetic gap 4' in the magnetic core 2'. Since this leakage magnetic flux is very small, it has no substantial effect on the cross-talk of a range of 40 to 50 dB or lower. However, the leakage magnetic flux becomes significant in the region of 60 dB and above, in particular. In order therefore to further reduce such small leakage magnetic flux, it has been devised that the edge portions a, a' of the shield case 1 are chamfered to disperse the magnetic flux, thereby producing a phase difference in the magnetic flux. With this magnetic flux dispersion, the cross-talk of 60 dB and above becomes possibly eliminated.

Figure 3A:
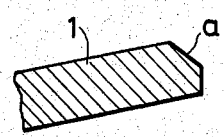
FIGS. 3A, 3B and 3C are partial cross-sectional views showing various shapes of chamfered portions in the shield casing.
Figure 3B:
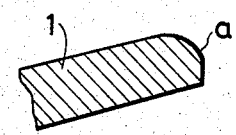
Figure 3C:
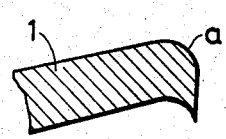
Figure 4A:
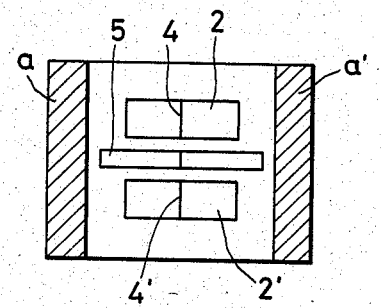
FIGS. 4A, 4B, 4C and 4D are schematic front views showing various embodiments of the edge portion or portions to be chamfered.
Figure 4C:
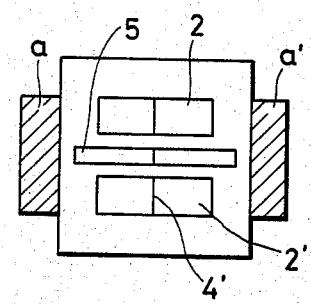
Figure 4B:
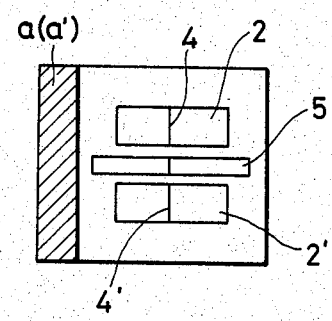
Figure 4D:
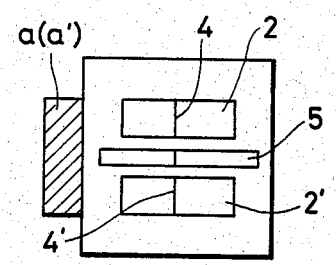

The shape of the edge portions a, a' as chamfered may be those as shown in FIGS. 3A, 3B and 3C, wherein they are in a slanted or arcuate form so as to moderate an angular change. It may also be feasible that the edge portion be chamfered at either or both sides over the full length thereof as shown in FIGS. 4A and 4B, or at either or both sides for only a partial length thereof as shown in FIGS. 4C and 4D.

As has so far been explained in the foregoing, the present invention proposes to chamfer at least one side of the window opening in the shield case, which is substantially perpendicular to the travelling direction of the magnetic recording medium, to reduce influence of the cross-talk due to the shield case, whereby favorable magnetic recording and reproducing operations become possible. As the result of actual manufacture of, and experiments on, such magnetic heads, it has been found out that the cross-talk at the reproduction reduces by approximately 10 dB from 62 dB to 52 dB, which exhibits an improvement. Similar improvement can also be obtained when the both edges are chamfered partially as shown in FIG. 4. Also, when the only one edge is chamfered as shown in FIGS. 4B and 4D, an improvement of about 7 to 8 dB can be attained.

What we claim is:

1. A magnetic head assembly comprising at least two magnetic head elements disposed proximate to each other for recording information in or reproducing information from respective tracks on a magnetic recording medium and a housing of magnetic material for magnetically shielding said magnetic head elements; wherein:

each of said magnetic head elements includes a magnetic core having a gap therein;

said housing includes an opening for exposing the recording medium to said gaps as the recording medium travels relative to said opening in a predetermined direction over a surface of said housing;

said opening has at least one edge extending substantially perpendicular to the predetermined direction of travel of the recording medium; and at least one said edge has a chamfered portion at said surface.

2. The magnetic head as set forth in claim 1, wherein said chamfered portion presents a slanted surface or an arcuate surface to the surface of said magnetic recording medium travelling across said opening.

* * * * *